US012327533B2

(12) United States Patent
Zhou et al.

(10) Patent No.: US 12,327,533 B2
(45) Date of Patent: Jun. 10, 2025

(54) LIQUID CRYSTAL DISPLAY PANEL DRIVE METHOD AND LIQUID CRYSTAL DISPLAY PANEL DRIVE DEVICE, LIQUID CRYSTAL DISPLAY APPARATUS, AND NON-TRANSITORY COMPUTER-READABLE STORAGE MEDIUM

(71) Applicant: HKC CORPORATION LIMITED, Shenzhen (CN)

(72) Inventors: Mancheng Zhou, Shenzhen (CN); Haijiang Yuan, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/644,659

(22) Filed: Apr. 24, 2024

(65) Prior Publication Data

US 2024/0355303 A1 Oct. 24, 2024

(30) Foreign Application Priority Data

Apr. 24, 2023 (CN) ......................... 202310445993.2

(51) Int. Cl.
*G09G 3/36* (2006.01)
*G09G 3/20* (2006.01)

(52) U.S. Cl.
CPC ......... *G09G 3/3614* (2013.01); *G09G 3/2007* (2013.01); *G09G 2320/0209* (2013.01)

(58) Field of Classification Search
CPC ............... G09G 3/3614; G09G 3/2007; G09G 2320/0209
See application file for complete search history.

(56) References Cited

U.S. PATENT DOCUMENTS

| | | | | |
|---|---|---|---|---|
| 2010/0001942 A1* | 1/2010 | Lin | ...................... | G09G 3/3614 345/100 |
| 2010/0158347 A1 | 6/2010 | He et al. | | |
| 2011/0037760 A1* | 2/2011 | Kim | ..................... | G09G 3/3614 345/96 |
| 2016/0202544 A1* | 7/2016 | Ro | ......................... | G02B 5/201 445/24 |
| 2021/0132426 A1* | 5/2021 | Yoshida | .............. | G06F 3/04164 |

FOREIGN PATENT DOCUMENTS

| | | |
|---|---|---|
| CN | 1614677 A | 5/2005 |
| CN | 101303490 A | 11/2008 |
| CN | 101995694 A | 3/2011 |

(Continued)

*Primary Examiner* — Kwang-Su Yang
(74) *Attorney, Agent, or Firm* — Maier & Maier, PLLC

(57) ABSTRACT

A liquid crystal display panel drive method including: determining a target pixel in a picture of a (k+1)-th frame according to a grayscale data of the (k+1)-th frame; acquiring a number difference between positive polarities and negative polarities in polarities of data drive signals of target pixels in a same row in the picture of the (k+1)-th frame; adjusting, a polarity of a data drive signal of a target pixel of the target row in the (k+1)-th frame data drive signal, and making an absolute value of the number difference corresponding to the target row to be less than or equal to the preset number; and driving the liquid crystal display panel to display the picture of the (k+1)-th frame based on the (k+1)-th frame data drive signal after being adjusted.

18 Claims, 3 Drawing Sheets

(56) References Cited

FOREIGN PATENT DOCUMENTS

| | | | |
|---|---|---|---|
| CN | 102262867 | A | 11/2011 |
| CN | 107068082 | A | 8/2017 |
| CN | 109036327 | A | 12/2018 |
| CN | 109410853 | A | 3/2019 |
| CN | 113781972 | A | 12/2021 |
| CN | 115223513 | A | 10/2022 |

* cited by examiner

| | | | | | | | | | | | | | | | | | |
|---|---|---|---|---|---|---|---|---|---|---|---|---|---|---|---|---|---|
| − 2 | + 1 | − 1 | + 1 | − 1 | + 1 | − 1 | + 1 | − 1 | − 1 | + 1 | + 1 | − 1 | + 1 | + 1 | − 1 | + 1 | + 2 |
| − 2 | + 1 | − 1 | + 2 | − 2 | + 2 | − 1 | + 1 | − 1 | − 1 | + 1 | + 1 | − 2 | + 2 | + 2 | − 1 | + 1 | + 2 |
| − 2 | + 1 | − 1 | + 2 | − 2 | + 2 | − 1 | + 1 | − 1 | − 1 | + 1 | + 1 | − 2 | + 2 | + 2 | − 1 | + 1 | + 2 |
| − 2 | + 1 | − 1 | + 1 | − 1 | + 1 | − 1 | + 1 | − 1 | − 1 | + 1 | + 1 | − 1 | + 1 | + 1 | − 1 | + 1 | + 2 |

LIQUID CRYSTAL DISPLAY PANEL DRIVE METHOD AND LIQUID CRYSTAL DISPLAY PANEL DRIVE DEVICE, LIQUID CRYSTAL DISPLAY APPARATUS, AND NON-TRANSITORY COMPUTER-READABLE STORAGE MEDIUM

CROSS REFERENCE TO RELATED APPLICATION

This application claims priority to Chinese Patent Application No. 202310445993.2, filed on Apr. 24, 2023, which is incorporated herein by reference as in case that fully set forth herein.

TECHNICAL FIELD

The present application relates to the technical filed of liquid crystal display apparatuses, and more particularly to a liquid crystal display panel drive method and device, a liquid crystal display apparatus, and a storage medium.

BACKGROUND

Compared with traditional display apparatuses containing high-voltage components (such as Cathode Ray Tube (CRT)), liquid crystal display apparatuses have the advantages of low radiation, large visual area, small size, light weight, and good picture quality. The liquid crystal display apparatus is usually driven in a polarity reversal manner, the voltage (Vs) of the data drive signal provided by the data line being higher than the common voltage (Vcom) provided by the common electrode line is defined as positive ("+") polarity, and the voltage of the data drive signal being lower than the common electrode voltage is defined as negative ("−") polarity. The common electrode line is easily affected by the signal interference of the data line to generate a voltage jitter phenomenon, which leads to the crosstalk phenomenon in the screen displayed by the liquid crystal display apparatus.

SUMMARY

In view of this, an embodiment of the present application provides a drive method and device, a liquid crystal display apparatus and a storage medium to solve the problem that the signal interference of the data line onto the common electrode line results in the crosstalk phenomenon of the picture displayed by the liquid crystal display apparatus.

In a first aspect, an embodiment of the present application provides a drive method, which includes:

- determining a target pixel in a picture of a (k+1)-th frame according to a grayscale data of the (k+1)-th frame; and a grayscale value of the target pixel is greater than a preset grayscale value, and k is an arbitrary integer greater than or equal to 0;
- acquiring a number difference between positive polarities and negative polarities in polarities of data drive signals of target pixels in a same row in the picture of the (k+1)-th frame;
- adjusting, in case that there is a target row with a number difference of the target row being greater than a preset number, a polarity of a data drive signal of a target pixel of the target row in a (k+1)-th frame data drive signal, and making an absolute value of the number difference corresponding to the target row to be less than or equal to the preset number; and the preset number is configured to be positively correlated with a value of a parasitic capacitor between a data line and a common electrode line of a liquid crystal display panel; and
- driving the liquid crystal display panel to display the picture of the (k+1)-th frame based on the (k+1)-th frame data drive signal after being adjusted.

In a second aspect, an embodiment of the present application provides a drive device, which includes: a determination circuit, an acquisition circuit, an adjustment circuit, and a drive circuit;

- the determination circuit is configured for determining a target pixel in a picture of a (k+1)-th frame according to a grayscale data of the (k+1)-th frame; and a grayscale value of the target pixel is greater than a preset grayscale value, and k is an arbitrary integer greater than or equal to 0;
- the acquisition circuit is configured for acquiring a number difference between positive polarities and negative polarities in polarities of data drive signals of target pixels in a same row in the picture of the (k+1)-th frame;
- the adjustment circuit is configured for adjusting, in case that there is a number difference of a target row being greater than a preset number, a polarity of a data drive signal of a target pixel of the target row in the (k+1)-th frame data drive signal, and making an absolute value of the number difference corresponding to the target row to be less than or equal to the preset number; and the preset number is configured to be positively correlated with a value of a parasitic capacitor between a data line and a common electrode line of a liquid crystal display panel; and
- the drive circuit is configured for driving the liquid crystal display panel to display the picture of the (k+1)-th frame based on the (k+1)-th frame data drive signal after being adjusted.

In a third aspect, an embodiment of the present application provides a liquid crystal display apparatus, which includes: a liquid crystal display panel, a source driver, a memory, a processor, and a computer program stored in the memory and capable of running on the processor; and the processor executes the computer program to implement the steps of the drive method as described in the first aspect.

In a fourth aspect, an embodiment of the present application provides a computer-readable storage medium storing a computer program, and the processor executes the computer program to implement the steps of the drive method as described in the first aspect.

In the drive method provided in the first aspect of the embodiment of the present application, the target pixel with grayscale value being greater than the preset grayscale value in a corresponding frame according to the grayscale data of any frame; then the a number difference between positive polarities and negative polarities in polarities of data drive signals of target pixels in a same row in the picture of the frame is acquired; then, in case that there is a target row with the number difference of the target row being greater than the preset number, the polarity of the data drive signal of the target pixel of the target row in the data drive signal of the frame is adjusted, such that the absolute value of the number difference corresponding to the target row is less than or equal to the preset number determined based on the value of the parasitic capacitor between the data line and the common electrode line of the liquid crystal display panel; and finally, the liquid crystal display panel is driven to display the picture of the frame based on the data drive signal of the frame after being adjusted. Thus, the crosstalk phenomenon caused by the signal interference of the common electrode line by the data line can be effectively improved, and the picture quality of the liquid crystal display panel can be improved.

It can be understood that the beneficial effects of the second to fourth aspects mentioned above can be found in the relevant descriptions in the first aspect, and which will not be further elaborated here.

BRIEF DESCRIPTION OF THE DRAWINGS

In order to explain the embodiments of the present application more clearly, a brief introduction regarding the accompanying drawings that need to be used for describing the embodiments of the present application or the prior art is given below; it is obvious that the accompanying drawings described as follows are only some embodiments of the present application, for those skilled in the art, other drawings can also be obtained according to the current drawings on the premise of paying no creative labor.

DETAILED DESCRIPTION OF EMBODIMENTS

Figure 1:
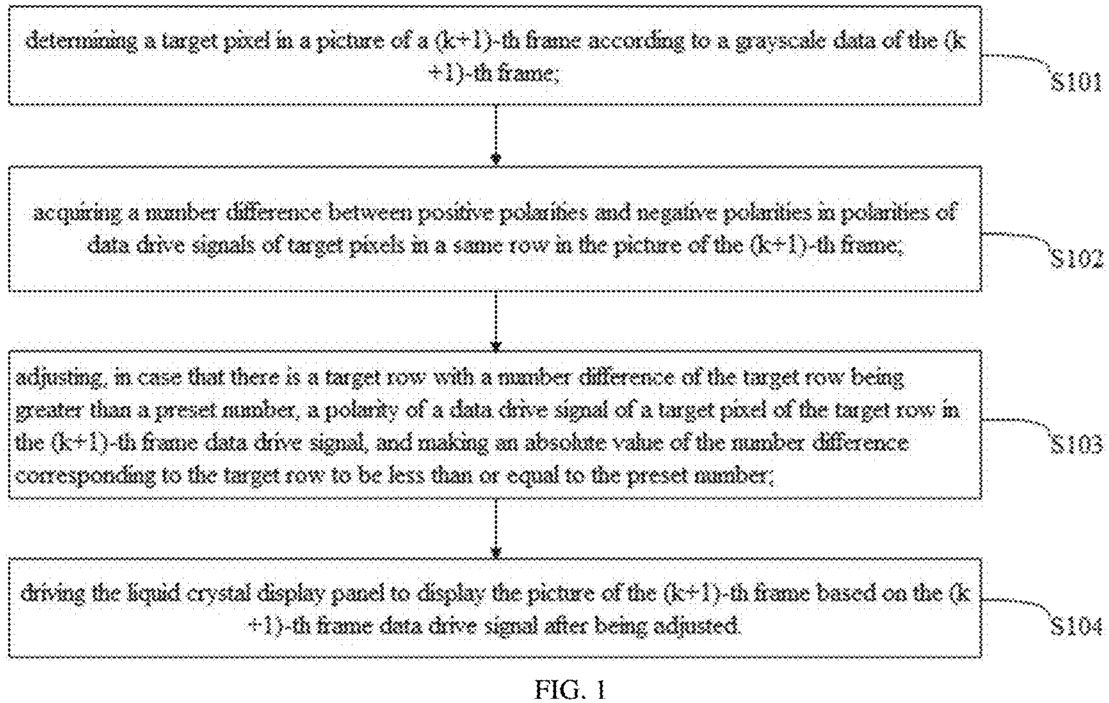
FIG. 1 is a flowchart of a drive method provided by an embodiment of the present application.

In the following description, specific details such as specific system structures and technologies are proposed for the purpose of illustration rather than limitation, in order to fully understand the embodiments of the present application. However, those skilled in the art should be aware that the present application can also be implemented in other embodiments without these specific details.

In other cases, detailed descriptions of well-known systems, devices, circuits, and methods are omitted to avoid unnecessary details hindering the description of the present application.

It should also be understood that the term "and/or" used in the description and the accompanying claims of the present application refers to any combination and all possible combinations of one or more of the related listed items, and includes these combinations.

In addition, in the description of the specification and the accompanying claims of the present application, the terms "first", "second", "third", etc. are only used to distinguish descriptions and cannot be understood as indicating or implying relative importance.

The reference to "an embodiment" or "some embodiments" described in the specification of the present application means that specific features, structures, or features described in conjunction with the embodiment are included in one or more embodiments of the present application. Therefore, the statements "in one embodiment," "in some embodiments," "in other embodiments", "in further other embodiments," and so on that appear differently in the specification do not necessarily refer to the same embodiment, but rather mean "one or more but not all embodiments", unless otherwise specifically emphasized. The terms "including", "comprising", "having", and their variations all mean "including but not limited to", unless otherwise specifically emphasized. "A plurality of, means "two, or "two or more".

The embodiment of the present application provides a drive method for driving a liquid crystal display panel. By adjusting the polarity of the data drive signal output to the target pixel with a larger grayscale value in each row, the number difference between positive polarities and negative polarities of the data drive signal of the target pixel in the same row is reduced. It can effectively improve the crosstalk phenomenon caused by the signal interference of the common electrode line and improve the picture quality of the liquid crystal display panel.

In the application, when the liquid crystal display panel displays a picture of any frame, the severity of the crosstalk phenomenon of pixels in any row of the liquid crystal display panel is positively correlated with the signal interference of the common electrode line connected to the pixels in the row, and the signal interference is related to the number difference between positive polarities and negative polarities of the data drive signal provided by the data line connected to the pixels in the row. in case that the number of the positive polarity is greater than the number of the negative polarity, the common voltage provided by the common electrode line jitters upward. in case that the number of the negative polarity is greater than the number of the positive polarity, the common voltage provided by the common electrode line jitters downward, the severity of the jitter is positively correlated with a number of the number difference, the jitter will lead to the picture displayed by the liquid crystal display panel is bright or dark (that is, crosstalk phenomenon), thus affecting the picture quality.

In the application, the liquid crystal display apparatus can include but is not limited to a color film substrate, an array substrate, and liquid crystals filled between the color film substrate and the array substrate.

A spacer is arranged between the color film substrate and the array substrate for supporting therebetween, the color film substrate is provided with a common electrode layer and a black matrix, and the array substrate is provided with a pixel electrode at a position of an opening region of the color film substrate. The positions of the array substrate covered by the black matrix are provided with a common electrode, a gate line, a data line and a switching element.

The drain electrode, source electrode and gate electrode of the switching element are electrically connected with the pixel electrode, the data line and the gate line respectively, the data line is electrically connected with a source driver, and the gate line is electrically connected with a gate driver.

Based on the structure of the above liquid crystal display apparatus, the working principle of the liquid crystal display apparatus is as follows:

When the gate driver outputs a turn-on voltage to the gate electrode of the switching element through the gate line and the source driver outputs a data drive signal to the source electrode of the switching element through the data line, the switching element is turned on. At this time, the active layer of the switching element forms a conductive channel between the source electrode and the drain electrode, and the data drive signal is transmitted to the pixel electrode through the conductive channel between the source electrode and the drain electrode, and the pixel voltage is formed at the pixel electrode.

The liquid crystal molecules located at the position of the pixel electrode is deflected by the electric field generated by the voltage difference between the common voltage accessed by the common electrode layer and the pixel voltage. The light emitted from the backlight plate is refracted through the deflected liquid crystal molecules and then emitted out from the color film substrate, and the brightness of the emitted light is proportional to the voltage difference between the pixel voltage and the common voltage.

When the gate driver outputs the turn-off voltage to the gate electrode of the switching element through the gate line and the source driver outputs the data drive voltage to the source electrode of the switching element through the data line, the switching element is turned off. At this time, the channel formed in the active layer of the switching element is cutoff, which makes the cutoff between the source electrode and the drain electrode, and the data drive voltage output by the source driver cannot be transmitted to the pixel electrode.

In a frame duration, the duration of the gate driver outputting the turn-off voltage is more than that of outputting the turn-on voltage, and after the switching element is turned off, due to the charge retention action of a parallel-plate capacitor (also known as a Storage Capacitor (CST)) formed between the wiring of the drain electrode of the switching element and the wiring of the common electrode, or formed between the wiring of the drain electrode of the switching element and the wiring of the gate electrode of the next switching element, so that the voltage difference between the pixel voltage and the common voltage can be maintained until the beginning of the next frame after the switching element is turned off, and the liquid crystal molecule can keep deflecting within one frame duration.

Based on the above principle, the liquid crystal molecules deflection at the positions of all pixel electrodes of the liquid crystal display apparatus can cause the liquid crystal display apparatus to display a picture of one frame.

Embodiment 1

As shown in FIG. 1, the drive method provided by an embodiment of the present application includes the following steps S101 to S104:

In step S101, determining a target pixel in a picture of a (k+1)-th frame according to a grayscale data of the (k+1)-th frame; and then entering the step S102.

In the application, when the liquid crystal display apparatus receives an image data of the (k+1)-th frame, the grayscale data of the (k+1)-th frame is extracted based on the image data of the (k+1)-th frame, the image data of the (k+1)-th frame is used to drive the liquid crystal display panel to display the picture of the (k+1)-th frame, and the grayscale data of the (k+1)-th frame contains the grayscale value of each pixel in the picture of the (k+1)-th frame. The processor of the liquid crystal display apparatus generates the data drive signal corresponding to the (k+1)-th frame according to the grayscale data of the (k+1)-th frame.

In the application, k is an arbitrary integer greater than or equal to 0, that is, the picture of the (k+1)-th frame can be a picture of any frame, that is, the drive method provided in the embodiment of the present application can be used to drive the liquid crystal display panel to display the picture of any frame. Correspondingly, the image data of the (k+1)-th frame, the grayscale data of the (k+1)-th frame, and the (k+1)-th frame data drive signal, are the data or signal needed to drive the liquid crystal display panel to display the picture of the (k+1)-th frame. When the value of k changes continuously (for example, k=0, 1, 2, . . . m, and m is any positive integer), it can drive the liquid crystal display panel to continuously display pictures of m frames or videos containing the pictures of m frames.

In the application, the data drive signal provided by the data line connected to the solid pixel corresponding to the virtual pixel with low grayscale value in the (k+1)-th frame (that is, the pixels in the liquid crystal display panel) has very little impact on the voltage of the common electrode, which is almost negligible. Therefore, it is only necessary to consider the polarity of the data drive signal accessed by the solid pixel corresponding to the virtual pixel (defined as the target pixel) whose grayscale value is greater than the preset grayscale value in the picture of the (k+1)-th frame. The preset grayscale threshold can be set to a higher grayscale value as required, for example, any value from 120 to 127, which can be 120 or 127.

In one embodiment, the step S101 includes:

- determining, in case that the grayscale data of the (k+1)-th frame is different from that of the k-th frame, the target pixel in the (k+1)-th frame according to the grayscale data of the (k+1)-th frame frame; where k is an arbitrary integer greater than 0.

In the application, in case that the picture of the (k+1)-th frame is not the picture of the first frame that the liquid crystal display panel needs to display, but the picture of the second frame or any frame after the second frame, since the polarity of the data drive signal of the target pixel in the target row of the data drive signal of the k-th frame has been adjusted when the picture of the k-th frame before he picture of the (k+1)-th frame is displayed, such that the absolute value of the number difference corresponding to the target row in the picture of the k-th frame is less than or equal to the preset number. Therefore, in case that the grayscale of the picture of the (k+1)-th frame does not change relative to the picture of the k-th frame, that is, the grayscale data of the (k+1)-th frame is the same as that of the k-th frame, it is not necessary to adjust the polarity of the data drive signal of the target pixel in the target row in the (k+1)-th frame data drive signal. It can directly adopt the same polarity as the data drive signal of the k-th frame, which can effectively simplify the drive process and improve the drive efficiency. in case that the grayscale of the picture of the (k+1)-th frame changes relative to the picture of the k-th frame, that is, the grayscale data of the (k+1)-th frame is the same as that of the k-th frame, that is, the grayscale data of the (k+1)-th frame is different from that of the k-th frame, then the polarity of the data drive signal of the target pixel of the target row in the (k+1)-th frame data drive signal is needed to be adjusted again. In other words, the steps S101 to S104 is needed to be performed.

In one embodiment, after the step S101, the method further includes:

- In case that there is a row in the picture of the (k+1)-th frame where the number of target pixels is greater than the preset number, then entering the step S102;
- driving, in case that there is no row in the picture of the (k+1)-th frame where the number of target pixels is less than or equal to the preset number, the liquid crystal display panel to display the picture of the (k+1)-th frame according to the image data of the (k+1)-th frame.

In the application, in case that the number of target pixels in at least one row is greater than the preset number, there may be a target row where the number difference is greater than the preset number, and the step S102 can continue to be performed. In the case that the number of target pixels in each row is less than or equal to the preset number, there can be no a target row where the number difference is greater than the preset number, at this time, there is no need to continue to perform the step S102, and there is no need to adjust the polarity of the data drive signal of the target pixel, and the liquid crystal display panel can be directly driven to display the picture of the (k+1)-th frame according to the image data of the (k+1)-th frame; and the drive process is simple and the drive efficiency is improved.

In step S102, acquiring a number difference between positive polarities and negative polarities in polarities of data drive signals of target pixels in a same row in the picture of the (k+1)-th frame; then entering a step S103.

In the application, since when the liquid crystal display panel displays the picture of the (k+1)-th frame, the severity of the crosstalk phenomenon of pixels in any row of the liquid crystal display panel is positively correlated with the signal interference of the common electrode line connected to the pixels in this row, and the signal interference is related to the number difference between positive polarities and negative polarities of the data drive signal provided by the data line connected to the pixels in this row. Therefore, before driving the liquid crystal display panel to display the picture of the (k+1)-th frame, it is necessary to acquire the number difference between positive polarities and negative polarities of the data drive signal that the corresponding solid pixel of each row of target pixels in the picture of the (k+1)-th frame needs to be accessed. The number difference between positive polarity and the negative polarity in the polarity of the data drive signal of the target pixel in the same row is acquired by: acquiring the number of data drive signals with the positive polarity in the data drive signal of the target pixel in the same row (defined as a first number), acquiring the number of data drive signals with the negative polarity in the data drive signal of the target pixel in the same row (defined as a second number), and then calculating the difference between the first number and the second number as the number difference.

Figure 2:
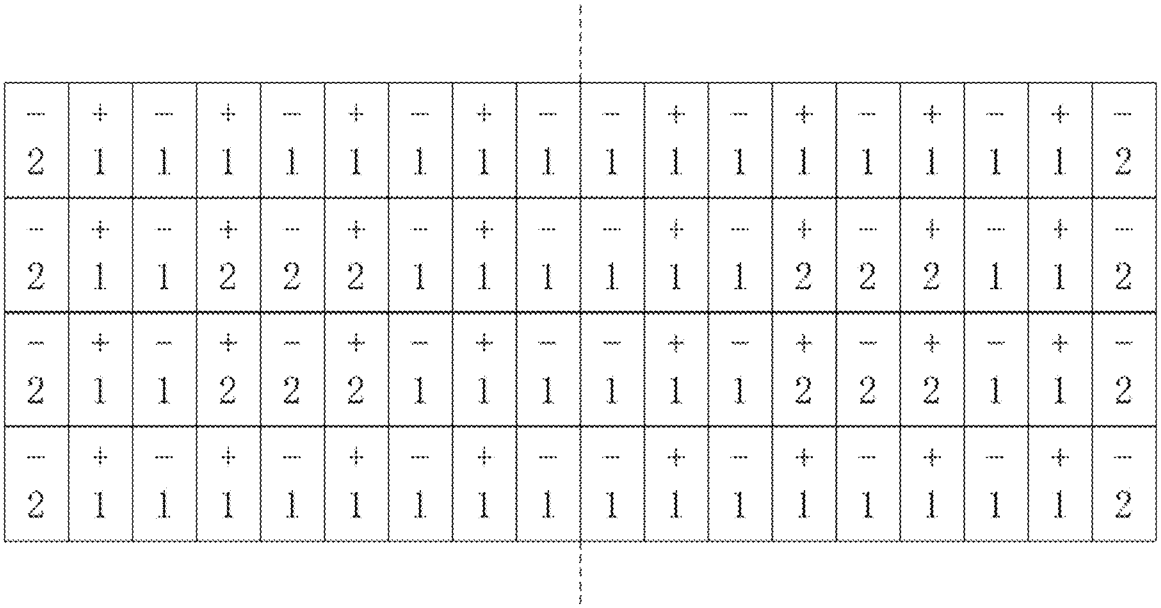
FIG. 2 is a first schematic diagram of a polarity of a data drive signal of each pixel in a (k+1)-th frame provided by an embodiment of the present application.

As shown in FIG. 2, the polarity of the data drive signal of each pixel in the picture of the (k+1)-th frame is shown. The picture of the (k+1)-th frame is 4 rows×18 columns, the target pixel where the grayscale value is greater than the preset grayscale value is marked as “1”, the target pixel where the grayscale value is less than or equal to the preset grayscale value is marked as “2”, the pixel where the data drive signal is positive is marked as “+”, and the pixel where the data drive signal is negative is marked as “−”. The number differences between lines 1 and 10 are +2, −2, −2, and +2, respectively.

In the step S103, adjusting, in case that there is a target row with a number difference of the target row being greater than a preset number, a polarity of a data drive signal of a target pixel of the target row in the (k+1)-th frame data drive signal, and making an absolute value of the number difference corresponding to the target row to be less than or equal to the preset number; then entering a step S104.

In the application, after the number differences between positive polarity and the negative polarity in the polarity of the data drive signal of the target pixel in each row are acquired, that is, comparing the number difference corresponding to each row with the preset number, the row where the number difference is greater than the preset number in the picture of the (k+1)-th frame is defined as the target row. The crosstalk phenomenon can effectively improve or even be eliminated by only adjusting the polarity of the data drive signal of the target pixel in the target row in the (k+1)-th frame data drive signal, and making the absolute value of the number difference corresponding to the target row is less than or equal to the preset number. In case that there are no rows in the picture of the (k+1)-th frame with a number difference greater than the preset number, it indicates that crosstalk phenomenon will not occur when the original (k+1)-th frame data drive signal is used to drive the liquid crystal display panel to display the picture of the (k+1)-th frame, and there is no need to adjust the (k+1)-th frame data drive signal.

In the application, the preset number corresponding to the target row in the picture of the (k+1)-th frame (or the (k+1)-th frame data drive signal) is positively correlated with the value of the parasitic capacitor between the data line and the common electrode line connected to the solid pixel of the target row in the liquid crystal display panel. The larger the parasitic capacitor, the larger the preset number needs to be set to a larger value. The parasitic capacitor include a capacitor of liquid crystal and a storage capacitor, and the capacitor of liquid crystal (CLC) is a flat plate capacitor formed between the wiring of the pixel electrode of the solid pixel and the wiring of the common electrode line. Since the value of the parasitic capacitor corresponding to each row of pixels in the liquid crystal display panel of different liquid crystal display apparatuses are different. Therefore, the different preset numbers can be set for different liquid crystal display apparatuses to reduce the difficulty of adjusting the polarity of the data drive signal of different liquid crystal display apparatuses.

In one embodiment, the preset number can be set to 0.

In the application, for different liquid crystal display apparatuses, the preset number can be set to 0, so that there is no need to set different preset numbers for different liquid crystal display apparatuses, which can effectively reduce the implementation difficulty of the drive method, so that it can be widely used in different liquid crystal display apparatuses.

In one embodiment, the step S103 includes:

Adjusting, in case that there is a target row with the number difference of the target row being greater than the preset number, the polarity of the data drive signal of the target pixel of the target row in the (k+1)-th frame data drive signal in a partitioned manner, and making the absolute value of the number difference corresponding to the target row to be less than or equal to the preset number.

In the application, in order to reduce the difficulty of adjusting the polarity of the data drive signal of the target pixel of the target row, the target pixel of each target row can be divided into a plurality of regions in advance, and then the polarity inversion mode of the data drive signal of the target pixel in the same region can be made the same, so as to bulk adjust the polarity of the data drive signal for all target pixels in each region. The polarity inversion mode includes, but is not limited to: a frame inversion mode, a column inversion mode, a dot inversion mode, a row inversion mode, a 1+2 line inversion mode, and a line inversion mode, etc.

In one embodiment, the number of the target pixels in each region are the same; or, the number of the target pixels in at least two regions are different.

In the application, the number of target pixels divided by each target row and the number of target pixels in each region is not limited, which can be set according to actual needs. The more the number of regions, the higher the adjustment accuracy. The number of target pixels in different regions can be the same or different.

In one embodiment, in case that the picture of the (k+1)-th frame includes a plurality of sub-frames that are the same, the target pixels belonging to the same sub-frame in the target row are divided into one region.

In the application, in case that the (k+1)-th frame includes the plurality of sub-frames that are the same, a feasible region division rule for the target pixels in each target row is as follows: the target pixels belonging to the same sub-frame in each target row are divided into one region. This partition method can effectively simplify the process of region partitioning and improve the efficiency of data processing.

As shown in FIG. 2, the target pixels of each target row in the picture of the (k+1)-th frame is divided into two regions, and the polarity inversion modes of two regions in each target row are dot inversion mode.

In one embodiment, the step S103 includes:

In case that there is a target row with the number difference of the target row being greater than the preset number, and the number difference corresponding to the target row in the (k+1)-th frame is the same as that of in a k-th frame, then adjusting a polarity inversion mode of the data drive signal of the target pixel in the target row in the (k+1)-th frame data drive signal to be the same as that of a data drive signal of the k-th frame, and making the absolute value of the number difference corresponding to the target row in the (k+1)-th frame data drive signal to be less than or equal to the preset number; and where k is an arbitrary integer greater than 0.

In the application, in case that the picture of the (k+1)-th frame is not the picture of the first frame that the liquid crystal display panel needs to display, but the picture of the second frame or any frame after the second frame, since the polarity of the data drive signal of the target pixel in the target row of the data drive signal of the k-th frame has been adjusted by using the determined polarity inversion mode when the picture of the k-th frame before he picture of the (k+1)-th frame is displayed, such that the absolute value of the number difference corresponding to the target row in the picture of the k-th frame is less than or equal to the preset number. Therefore, in case that the number difference corresponding to the target row in the picture of the (k+1)-th frame does not change relative to that of the target row in the picture of the k-th frame, then the polarity inversion mode used to adjust the polarity of the data drive signal of the target pixel of the target row in the data drive signal of the picture of the k-th frame can be used to the polarity of the data drive signal of the target pixel of the target row in the data drive signal of the picture of the (k+1)-th frame, which can effectively simplify the driving process and improve the driving efficiency. in case that the number difference corresponding to the target row in the picture of the (k+1)-th frame changes relative to that of the target row in the picture of the k-th frame, the polarity inversion mode suitable for the picture of the (k+1)-th frame needs to be adopted according to the actual situation to adjust the polarity of the data drive signal of the target pixel in the target row in the (k+1)-th frame data drive signal.

In step S104, driving the liquid crystal display panel to display the picture of the (k+1)-th frame based on the (k+1)-th frame data drive signal after being adjusted.

In the application, after adjusting the polarity of the data drive signal of the target pixel in each target row in the (k+1)-th frame data drive signal, and making the absolute value of the number difference corresponding to each target row is less than or equal to the preset number, the adjusted (k+1)-th frame data drive signal can then be output to the liquid crystal display panel to drive the solid pixels to light up, so as to display the picture of the (k+1)-th frame.

Figures 3, 4:
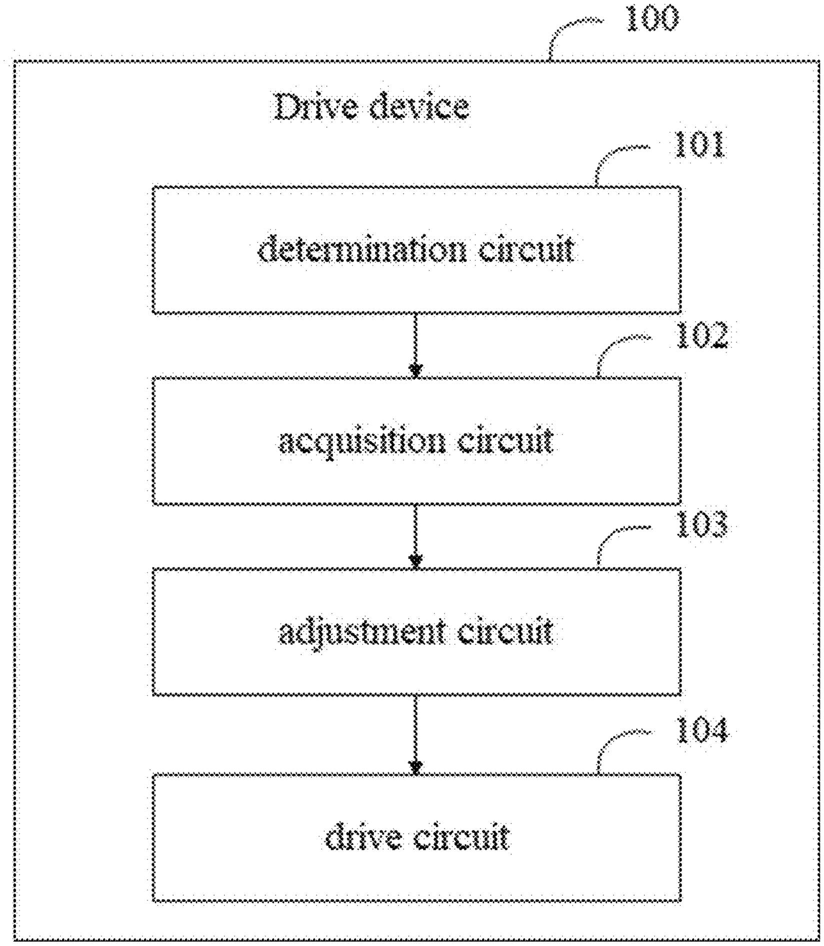
FIG. 3 is a second schematic diagram of a polarity of a data drive signal of each pixel in a (k+1)-th frame provided by an embodiment of the present application.
FIG. 4 is a structural schematic diagram of a drive device provided by an embodiment of the present application.

As shown in FIG. 3, which shows the polarity of the data drive signal of each pixel in the picture of the (k+1)-th frame displayed on the liquid crystal display panel after adjusting the (k+1)-th frame data drive signal in the partition manner; the polarity inversion mode of the first region of each target row remains unchanged, and it is still the dot inversion mode. The polarity inversion mode of the second region of each target row changes from the dot inversion mode to the 1+2 line inversion mode.

In one embodiment, the drive method further includes:

driving, in case that an image data is received after receiving a turn-off instruction from an user, the liquid crystal display panel to display the picture based on the image data.

In the application, the user can terminate the polarity adjustment step at any time according to the actual needs (for example, when the user determines that the pictures displayed by the liquid crystal display panel in a next period of time are pictures with the grayscale value being less than or equal to the preset grayscale value). Thus, when the processor of the liquid crystal display apparatus receives the image data used to drive the liquid crystal display panel to display the picture of a next frame, it can directly drive the liquid crystal display panel to display the picture of the (k+1)-th frame according to the image data of the (k+1)-th frame, which simplify the driving process and improve the driving efficiency.

In the application, the liquid crystal display apparatus or the user terminal communicating with the liquid crystal display apparatus can include any human-computer interaction devices for receiving the turn-off instruction input by the user, and the human-computer interaction device can include at least one of the a physical key, a touch sensor, a gesture recognition sensor, and a voice recognition unit; so that the user can input the turn-off instruction through the corresponding touch method, a gesture control method or a voice control method. The physical key and the touch sensor can be set in any position on the liquid crystal display apparatus or user terminal, for example, the control panel. The touch method of the physical key can be pressed or flicked. The touch method of the touch sensor can be pressed or touched. The gesture recognition sensor can be set in any position outside the housing of the liquid crystal display apparatus. The gestures used to control the liquid crystal display apparatus or the user terminal can be customized by the user according to the actual needs or adopt the factory default settings. The voice recognition unit can include a microphone and a voice recognition chip, it can also include only a microphone and be implemented by the processor of the liquid crystal display apparatus or user terminal for voice recognition function. The voice used to control the liquid crystal display apparatus or user terminal can be customized by the user according to the actual needs or adopt the factory default settings.

In the application, the user terminal can be a mouse, a remote control, a mobile phone, a tablet, a wearable device, an augmented reality (AR)/virtual reality (VR) devices, a laptop, an ultra-mobile personal computer (UMPC), a netbook, a personal digital assistant (PDA) and other devices capable of controlling the liquid crystal display apparatuses.

It should be understood that the sequence number of the steps in the above embodiments does not imply the order of execution, and that the order of execution of each process shall be determined by its function and internal logic, and shall not constitute any limitation on the implementation process of the embodiments of the present application.

Embodiment 2

The present application embodiment also provides a drive device for performing the method steps in the above embodiments of the drive method. The device can be a virtual appliance in the liquid crystal display apparatus, run by the processor of the liquid crystal display apparatus, or it can be the liquid crystal display apparatus itself.

As shown in FIG. 4, the drive device 100 provided in the embodiment of the present application includes:

a determination circuit 101, configured for determining a target pixel in a picture of a (k+1)-th frame according to a grayscale data of the (k+1)-th frame, then entering an acquisition circuit 102; and a grayscale value of the target pixel is greater than a preset grayscale value, and k is an arbitrary integer greater than or equal to 0;

the acquisition circuit 102, configured for acquiring a number difference between positive polarities and negative polarities in polarities of data drive signals of target pixels in a same row in the picture of the (k+1)-th frame, then entering an adjustment circuit 103;

the adjustment circuit 103, configured for adjusting, in case that there is a number difference of a target row being greater than a preset number, a polarity of a data drive signal of a target pixel of the target row in the (k+1)-th frame data drive signal, and making an absolute value of the number difference corresponding to the target row to be less than or equal to the preset number, then entering a drive circuit 104; the preset number is configured to be positively correlated with a value of a parasitic capacitor between a data line and a common electrode line of a liquid crystal display panel; and the drive circuit 104, configured for driving the liquid crystal display panel to display the picture of the (k+1)-th frame based on the (k+1)-th frame data drive signal after being adjusted.

In one embodiment, the acquisition circuit is specifically configured for:

acquiring, in case that there is a row in the picture of the (k+1)-th frame where the number of target pixels is greater than the preset number, the number difference between positive polarities and negative polarities in polarities of the data drive signal of the target pixel in a same row in the picture of the (k+1)-th frame, then entering the adjustment circuit 103.

In one embodiment, the drive circuit is further configured for:

driving, in case that there is no row in the picture of the (k+1)-th frame where the number of target pixels is less than or equal to the preset number, the liquid crystal display panel to display the picture of the (k+1)-th frame according to the image data of the (k+1)-th frame.

In one embodiment, the drive circuit is further configured for:

driving, in case that an image data is received after receiving a turn-off instruction from an user, the liquid crystal display panel to display the picture based on the image data.

In application, the circuits in the device can be software program modules, can be implemented by different logic circuits integrated in the processor or independent physical components connected to the processor, or can be implemented by multiple distributed processors.

Embodiment 3

Figure 5:
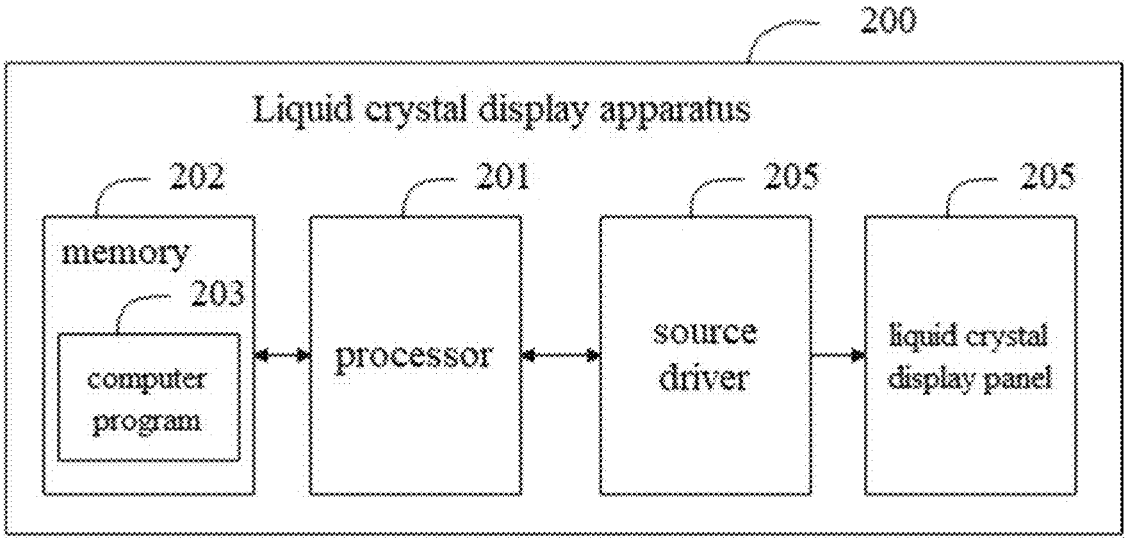
FIG. 5 is a structural schematic diagram of a liquid crystal display apparatus provided by an embodiment of the present application.

As shown in FIG. 5, the embodiment of the present application further provides a liquid crystal display apparatus 200, which includes: at least one processor 201 (only one processor is shown in FIG. 5), a memory 202, a computer program 203 stored in the memory 202 and capable of running on the at least one processor 201, a source driver 204, and a liquid crystal display panel 205, where the processor 201 executes the computer program 203 to implement the steps in each of the above embodiments of the method.

In applications, the liquid crystal display apparatus can include, but is not limited to, a processor, a memory, a source driver, and a liquid crystal display panel. FIG. 5 is only an example of the liquid crystal display apparatus, and does not constitute a limitation to the liquid crystal display apparatus; which can include more or less components than shown in the figure, or a combination of some components, or different components, for example, a color film substrate, an array substrate, liquid crystals filled between the color film substrate and the array substrate, a gate driver, a human-computer interaction device, an input and output device, a network access device, etc. The network access device can include a communication module for the communication between the liquid crystal display apparatus and the user terminal.

In an application, the processor can be CPU (Central Processing Unit), and can also be other general purpose processor, DSP (Digital Signal Processor), ASIC (Application Specific Integrated Circuit), FGPA (Field-Programmable Gate Array), or some other programmable logic devices, discrete gate or transistor logic device, discrete hardware component, etc., for example, the processor can be a timing controller (TCON). The general purpose processor can be a microprocessor, or alternatively, the processor can also be any conventional processor and so on.

In the application, the memory may in some embodiments be the internal storage unit of the liquid crystal display apparatus, for example, the hard disk or memory of the liquid crystal display apparatus. The memory in other embodiments may also be an external storage device of the liquid crystal display apparatus, for example, a plug-in hard disk, Smart Media Card (SMC), Secure Digital (SD) Card, Flash Card, etc., equipped with the liquid crystal display apparatus. The memory can also include both the internal storage unit of the liquid crystal display apparatus and the external storage device. The memory is used to store operating systems, applications, Boot loaders, data, and other programs, such as program code for computer programs. The memory can also be configured to storing data that has been output or being ready to be output temporarily.

In the application, the communication module can be set as any device capable of direct or indirect long-distance wired or wireless communication with the user terminal according to actual needs. For example, the communication module can provide applications on network equipment including wireless Local Area Networks (WLAN) (e.g. Wi-Fi networks), Bluetooth, Zigbee, mobile communication networks, Global Navigation Satellite System (GNSS), Frequency Modulation (FM), Near Field Communication technology (NFC), Infrared technology (IR) and other communication solutions. The communication module can include an antenna, which may have only one array element, or an antenna array consisting of multiple array elements. The communication module can receive the electromagnetic wave through the antenna, adjust the frequency and filter the electromagnetic wave signal, and send the processed signal to the processor. The communication module can also receive the signal to be sent from the processor, perform frequency modulation and amplification, and convert it into electromagnetic wave radiation through the antenna.

It should be noted that the information interaction and execution process between the above devices/modules are based on the same idea as the embodiments of the present application method, and their specific functions and technical effects can be detailed in the embodiments of the method, which will not be repeated here.

It can be clearly understood by the those skilled in the art that, for describing conveniently and concisely, dividing of the aforesaid various functional units, functional modules is described exemplarily merely, in an actual application, the aforesaid functions can be assigned to different functional units and functional modules to be accomplished, that is, an inner structure of a data synchronizing device is divided into functional units or modules so as to accomplish the whole or a part of functionalities described above. The various functional units, modules in the embodiments can be integrated into a processing unit, or each of the units exists independently and physically, or two or more than two of the units are integrated into a single unit. The aforesaid integrated unit can by either actualized in the form of hardware or in the form of software functional units. In addition, specific names of the various functional units and modules are only used for distinguishing from each other conveniently, but not intended to limit the protection scope of the present application. Regarding a specific working process of the units and modules in the aforesaid device, reference can be made to a corresponding process in the aforesaid method embodiments, it is not repeatedly described herein.

The embodiment of the present application further provides a computer-readable storage medium in which a computer program is stored, and when executed by a processor, the steps in the embodiments of each method described above are implemented.

The embodiment of the present application provides a computer program product, when the computer program product is run on the liquid crystal display apparatus, enables the liquid crystal display apparatus to perform the steps in the embodiments of each method described above.

In case that the integrated unit is achieved in the form of software functional units, and is sold or used as an independent product, it can be stored in a computer readable storage medium. Based on this understanding, a whole or part of flow process of implementing the method in the aforesaid embodiments of the present application can also be accomplished by using computer program to instruct relevant hardware. When the computer program is executed by the processor, the steps in the various method embodiments described above can be implemented. Wherein, the computer program comprises computer program codes, which can be in the form of source code, object code, executable documents or some intermediate form, etc. The computer readable medium can include: any entity or device that can carry the computer program codes, recording medium, USB flash disk, mobile hard disk, hard disk, optical disk, computer storage device, ROM (Read-Only Memory), RAM (Random Access Memory), etc., such as U disk, mobile hard disk, disk or CD.

In the above embodiments, the description of each embodiment has its own emphasis, and the parts that are not detailed or documented in an embodiment can be referred to the relevant descriptions of other embodiments.

Those skilled in the art may aware that, the elements and algorithm steps of each of the examples described in connection with the embodiments disclosed herein can be implemented in electronic hardware, or in combination with computer software and electronic hardware. Whether these functions are implemented by hardware or software depends on the specific application and design constraints of the technical solution. The skilled people could use different methods to implement the described functions for each particular application, however, such implementations should not be considered as going beyond the scope of the present application.

It should be understood that, in the embodiments of the present application, the disclosed device/terminal device and method could be implemented in other ways. For example, the device described above are merely illustrative; for example, the division of the units is only a logical function division, and other division could be used in the actual implementation, for example, multiple units or components could be combined or integrated into another system, or some features can be ignored, or not performed. In another aspect, the coupling or direct coupling or communicating connection shown or discussed could be an indirect, or a communicating connection through some interfaces, devices or units, which could be electrical, mechanical, or otherwise.

The modules described as separate components could or could not be physically separate, and the components displayed as modules could or could not be physical modules, which can be located in one place, or can be distributed to multiple network elements. Parts or all of the elements could be selected according to the actual needs to achieve the object of the present embodiment.

The above embodiments are only intended to explain but not to limit the technical solutions of the present application. Although the present application has been explained in detail with reference to the above-described embodiments, it should be understood for the ordinary skilled one in the art that, the technical solutions described in each of the above-described embodiments can still be amended, or some technical features in the technical solutions can be replaced equivalently; these amendments or equivalent replacements, which won't make the essence of corresponding technical solution to be broken away from the spirit and the scope of the technical solution in various embodiments of the present application, should all be included in the protection scope of the present application.

What is claimed is:

1. A liquid crystal display panel drive method, comprising:

determining a target pixel in a picture of a (k+1)-th frame according to a grayscale data of the (k+1)-th frame, wherein a grayscale value of the target pixel is greater than a preset grayscale value, and k is an arbitrary integer greater than or equal to 0;

acquiring a number difference between positive polarities and negative polarities in polarities of data drive signals of target pixels in a same row in the picture of the (k+1)-th frame;

adjusting, in case that there is a target row with the number difference of the target row being greater than a preset number, a polarity of a data drive signal of each target pixel of the target row in a (k+1)-th frame data drive signal, and making an absolute value of the number difference corresponding to the target row to be less than or equal to the preset number, wherein the preset number is configured to be positively correlated with a value of a parasitic capacitor between a data line and a common electrode line of a liquid crystal display panel; and driving the liquid crystal display panel to display the picture of the (k+1)-th frame based on the (k+1)-th frame data drive signal after being adjusted, wherein the step of adjusting, in case that there is a target row with a number difference of the target row being greater than the preset number, the polarity of the data drive signal of the target pixel of the target row in the (k+1)-th frame data drive signal, and making the absolute value of the number difference corresponding to the target row less than or equal to the preset number comprises:

adjusting, in case that there is a target row with the number difference of the target row being greater than the preset number, the polarity of the data drive signal of each target pixel of the target row in the (k+1)-th frame data drive signal in a partitioned manner, and making the absolute value of the number difference corresponding to the target row less than or equal to the preset number, and wherein the target pixel of the target row is divided into a plurality of regions, and polarity inversion modes of the data drive signal of the target pixel in a same region are the same.

2. The liquid crystal display panel drive method according to claim 1, wherein a number of the target pixels in each region are the same; or a number of the target pixels in at least two regions are different.

3. The liquid crystal display panel drive method according to claim 2, wherein the step of determining the target pixel in the picture of the (k+1)-th frame according to the grayscale data of the (k+1)-th frame comprises:

determining, in case that the grayscale data of the (k+1)-th frame is different from a grayscale data of a k-th frame, the target pixel in the picture of the (k+1)-th frame according to the grayscale data of the (k+1)-th frame, wherein k is an arbitrary integer greater than 0.

4. The liquid crystal display panel drive method according to claim 2, wherein the step of adjusting, in case that there is a target row with the number difference of the target row being greater than the preset number, the polarity of the data drive signal of the target pixel of the target row in the (k+1)-th frame data drive signal, and making the absolute value of the number difference corresponding to the target row less than or equal to the preset number comprises:

adjusting, in case that there is a target row with the number difference of the target row being greater than the preset number, and the number difference corresponding to the target row in the (k+1)-th frame is the same as a number difference corresponding to a target row in a k-th frame, a polarity inversion mode of the data drive signal of the target pixel in the target row in the (k+1)-th frame data drive signal to be the same as that of a data drive signal of the k-th frame, and making the absolute value of the number difference corresponding to the target row in the (k+1)-th frame data drive signal less than or equal to the preset number; and wherein k is an arbitrary integer greater than 0.

5. The liquid crystal display panel drive method according to claim 2, wherein the preset grayscale value ranges from 120 to 127.

6. The liquid crystal display panel drive method according to claim 1, wherein in case that the picture of the (k+1)-th frame comprises a plurality of sub-frames that are the same, the target pixels belonging to one same sub-frame in the target row are divided into one region.

7. The liquid crystal display panel drive method according to claim 6, wherein the step of determining the target pixel in the picture of the (k+1)-th frame according to the grayscale data of the (k+1)-th frame comprises:

determining, in case that the grayscale data of the (k+1)-th frame is different from a grayscale data of a k-th frame, the target pixel in the picture of the (k+1)-th frame according to the grayscale data of the (k+1)-th frame, wherein k is an arbitrary integer greater than 0.

8. The liquid crystal display panel drive method according to claim 6, wherein the step of adjusting, in case that there is a target row with the number difference of the target row being greater than the preset number, the polarity of the data drive signal of the target pixel of the target row in the (k+1)-th frame data drive signal, and making the absolute value of the number difference corresponding to the target row less than or equal to the preset number comprises:

adjusting, in case that there is a target row with the number difference of the target row being greater than the preset number, and the number difference corresponding to the target row in the (k+1)-th frame is the same as a number difference corresponding to a target row in a k-th frame, a polarity inversion mode of the data drive signal of the target pixel in the target row in the (k+1)-th frame data drive signal to be the same as that of a data drive signal of the k-th frame, and making the absolute value of the number difference corresponding to the target row in the (k+1)-th frame data drive signal less than or equal to the preset number; and wherein k is an arbitrary integer greater than 0.

9. The liquid crystal display panel drive method according to claim 6, wherein the preset grayscale value ranges from 120 to 127.

10. The liquid crystal display panel drive method according to claim 1, wherein the step of determining the target pixel in the picture of the (k+1)-th frame according to the grayscale data of the (k+1)-th frame comprises:

determining, in case that the grayscale data of the (k+1)-th frame is different from a grayscale data of a k-th frame, the target pixel in the picture of the (k+1)-th frame according to the grayscale data of the (k+1)-th frame, wherein k is an arbitrary integer greater than 0.

11. The liquid crystal display panel drive method according to claim 1, wherein the step of adjusting, in case that there is a target row with the number difference of the target row being greater than the preset number, the polarity of the data drive signal of the target pixel of the target row in the (k+1)-th frame data drive signal, and making the absolute value of the number difference corresponding to the target row less than or equal to the preset number comprises:

adjusting, in case that there is a target row with the number difference of the target row being greater than the preset number, and the number difference corresponding to the target row in the (k+1)-th frame is the same as a number difference corresponding to a target row in a k-th frame, a polarity inversion mode of the data drive signal of the target pixel in the target row in the (k+1)-th frame data drive signal to be the same as that of a data drive signal of the k-th frame, and making the absolute value of the number difference corresponding to the target row in the (k+1)-th frame data drive signal less than or equal to the preset number, and wherein k is an arbitrary integer greater than 0.

12. The liquid crystal display panel drive method according to claim 1, wherein the preset grayscale value ranges from 120 to 127.

13. The liquid crystal display panel drive method according to claim 1, wherein the step of determining the target pixel in the picture of the (k+1)-th frame according to the grayscale data of the (k+1)-th frame comprises:

determining, in case that the grayscale data of the (k+1)-th frame is different from a grayscale data of a k-th frame, the target pixel in the picture of the (k+1)-th frame according to the grayscale data of the (k+1)-th frame, wherein k is an arbitrary integer greater than 0.

14. The liquid crystal display panel drive method according to claim 1, wherein the step of adjusting, in case that there is a target row with the number difference of the target row being greater than the preset number, the polarity of the data drive signal of the target pixel of the target row in the (k+1)-th frame data drive signal, and making the absolute value of the number difference corresponding to the target row less than or equal to the preset number comprises:

adjusting, in case that there is a target row with the number difference of the target row being greater than the preset number, and the number difference corresponding to the target row in the (k+1)-th frame is the same as a number difference corresponding to a target row in a k-th frame, a polarity inversion mode of the data drive signal of the target pixel in the target row in the (k+1)-th frame data drive signal to be the same as that of a data drive signal of the k-th frame, and making the absolute value of the number difference corresponding to the target row in the (k+1)-th frame data drive signal less than or equal to the preset number; and wherein k is an arbitrary integer greater than 0.

15. The liquid crystal display panel drive method according to claim 1, wherein the preset grayscale value ranges from 120 to 127.

16. A liquid crystal display panel drive device, comprising:

a determination circuit, configured for determining a target pixel in a picture of a (k+1)-th frame according to a grayscale data of the (k+1)-th frame, wherein a grayscale value of the target pixel is greater than a preset grayscale value, and k is an arbitrary integer greater than or equal to 0;

an acquisition circuit, configured for acquiring a number difference between positive polarities and negative polarities in polarities of data drive signals of target pixels in a same row in the picture of the (k+1)-th frame;

an adjustment circuit, configured for adjusting, in case that there is a number difference of a target row being greater than a preset number, a polarity of a data drive signal of a target pixel of the target row in the (k+1)-th frame data drive signal, and making an absolute value of the number difference corresponding to the target row less than or equal to the preset number, wherein the preset number is configured to be positively correlated with a value of a parasitic capacitor between a data line and a common electrode line of a liquid crystal display panel; and a drive circuit, configured for driving the liquid crystal display panel to display the picture of the (k+1)-th frame based on the (k+1)-th frame data drive signal after being adjusted, wherein the step of adjusting, in case that there is a target row with a number difference of the target row being greater than the preset number, the polarity of the data drive signal of the target pixel of the target row in the (k+1)-th frame data drive signal, and making the absolute value of the number difference corresponding to the target row less than or equal to the preset number comprises:

adjusting, in case that there is a target row with the number difference of the target row being greater than the preset number, the polarity of the data drive signal of each target pixel of the target row in the (k+1)-th frame data drive signal in a partitioned manner, and making the absolute value of the number difference corresponding to the target row less than or equal to the preset number, and wherein the target pixel of the target row is divided into a plurality of regions, and polarity inversion modes of the data drive signal of the target pixel in a same region are the same.

17. A liquid crystal display apparatus, comprising: a liquid crystal display panel, a source driver, a memory, a processor, and a computer program stored in the memory and executable by the processor, wherein the processor is configured to, when executing the computer program, implement the following steps:

determining a target pixel in a picture of a (k+1)-th frame according to a grayscale data of the (k+1)-th frame; wherein a grayscale value of the target pixel is greater than a preset grayscale value, and k is an arbitrary integer greater than or equal to 0;

acquiring a number difference between positive polarities and negative polarities in polarities of data drive signals of target pixels in a same row in the picture of the (k+1)-th frame;

adjusting, in case that there is a target row with the number difference of the target row being greater than a preset number, a polarity of a data drive signal of each target pixel of the target row in a (k+1)-th frame data drive signal, and making an absolute value of the number difference corresponding to the target row to be less than or equal to the preset number, wherein the preset number is configured to be positively correlated with a value of a parasitic capacitor between a data line and a common electrode line of a liquid crystal display panel; and driving the liquid crystal display panel to display the picture of the (k+1)-th frame based on the (k+1)-th frame data drive signal after being adjusted, wherein the step of adjusting, in case that there is a target row with a number difference of the target row being greater than the preset number, the polarity of the data drive signal of the target pixel of the target row in the (k+1)-th frame data drive signal, and making the absolute value of the number difference corresponding to the target row less than or equal to the preset number comprises:

adjusting, in case that there is a target row with the number difference of the target row being greater than the preset number, the polarity of the data drive signal of each target pixel of the target row in the (k+1)-th frame data drive signal in a partitioned manner, and making the absolute value of the number difference corresponding to the target row less than or equal to the preset number, and wherein the target pixel of the target row is divided into a plurality of regions, and polarity inversion modes of the data drive signal of the target pixel in a same region are the same.

18. A non-transitory computer-readable storage medium storing a computer program, wherein the processor executes the computer program to implement the following steps;

determining a target pixel in a picture of a (k+1)-th frame according to a grayscale data of the (k+1)-th frame; wherein a grayscale value of the target pixel is greater than a preset grayscale value, and k is an arbitrary integer greater than or equal to 0;

acquiring a number difference between positive polarities and negative polarities in polarities of data drive signals of target pixels in a same row in the picture of the (k+1)-th frame;

adjusting, in case that there is a target row with the number difference of the target row being greater than a preset number, a polarity of a data drive signal of each target pixel of the target row in a (k+1)-th frame data drive signal, and making an absolute value of the number difference corresponding to the target row less than or equal to the preset number; wherein the preset number is configured to be positively correlated with a value of a parasitic capacitor between a data line and a common electrode line of a liquid crystal display panel; and driving the liquid crystal display panel to display the picture of the (k+1)-th frame based on the (k+1)-th frame data drive signal after being adjusted, wherein the step of adjusting, in case that there is a target row with a number difference of the target row being greater than the preset number, the polarity of the data drive signal of the target pixel of the target row in the (k+1)-th frame data drive signal, and making the absolute value of the number difference corresponding to the target row less than or equal to the preset number comprises:

adjusting, in case that there is a target row with the number difference of the target row being greater than the preset number, the polarity of the data drive signal of each target pixel of the target row in the (k+1)-th frame data drive signal in a partitioned manner, and making the absolute value of the number difference corresponding to the target row less than or equal to the preset number, and wherein the target pixel of the target row is divided into a plurality of regions, and polarity inversion modes of the data drive signal of the target pixel in a same region are the same.

* * * * *